(12) United States Patent
Freund

(10) Patent No.: US 10,536,530 B2
(45) Date of Patent: Jan. 14, 2020

(54) NETWORKED GATE MACHINES GAGING THE CONDITION OF UNMANNED PLATFORMS

(71) Applicant: Thomas Freund, West Hartford, CT (US)

(72) Inventor: Thomas Freund, West Hartford, CT (US)

(73) Assignee: Dig.y.SoL LLC, West Hartford, CT (US)

(*) Notice: Subject to any disclaimer, the term of this patent is extended or adjusted under 35 U.S.C. 154(b) by 381 days.

(21) Appl. No.: 15/448,025

(22) Filed: Mar. 2, 2017

(65) Prior Publication Data

US 2017/0257437 A1 Sep. 7, 2017

Related U.S. Application Data

(60) Provisional application No. 62/302,414, filed on Mar. 2, 2016.

(51) Int. Cl.
*H04L 29/08* (2006.01)
*H04L 12/58* (2006.01)

(52) U.S. Cl.
CPC ............ *H04L 67/125* (2013.01); *H04L 51/18* (2013.01)

(58) Field of Classification Search
CPC .... H04L 67/125; H04L 51/18; B64C 2201/00
See application file for complete search history.

(56) References Cited

U.S. PATENT DOCUMENTS

| | | | | |
|---|---|---|---|---|
| 6,061,613 A | * | 5/2000 | Zyburt | G08G 1/20 701/2 |
| 9,218,232 B2 | * | 12/2015 | Khalastchi | G06K 9/00496 |
| 9,912,655 B2 | * | 3/2018 | Canavor | H04L 63/0823 |
| 2017/0131727 A1 | * | 5/2017 | Kurdi | G06Q 10/06311 |

OTHER PUBLICATIONS

"Reverse Polish notation", archived Wikipedia article, last edited Dec. 31, 2016, retrieved from <https://web.archive.org/web/20170222132937/https://en.wikipedia.org/wiki/Reverse_Polish_notation> (7 pages).

(Continued)

*Primary Examiner* — Michael J Zanelli
(74) *Attorney, Agent, or Firm* — McCarter & English, LLP

(57) ABSTRACT

A system for gaging the condition of unmanned platforms is provided. The system can include a plurality of gate machines having a processor and a memory. The system further includes a plurality of sensors for receiving operational data for the unmanned platforms and sending the operational data to the plurality of gate machines. The plurality of gate machines can include computer-readable instructions stored thereon which, when executed by the plurality of gate machines, cause the plurality of gate machines to perform various steps. One of the steps can include converting the raw signals from the plurality of sensors to normalized values. Another step can include executing a set of obligations if a gate trigger is valid. Finally, another step can include testing one or more subsequent gates of the plurality of gate machines if the gate closure condition is valid.

20 Claims, 5 Drawing Sheets

(56) References Cited

OTHER PUBLICATIONS

"The CAN wiki pages", archived webpage last edited Dec. 23, 2016, retrieved from <https://web.archive.org/web/20170211224604/http://www.can-wiki.info/doku.php?id=start> (2 pages).

"About LEED", U.S. Green Building Council, archived webpage updated Jan. 2017, retrieved from <https://web.archive.org/web/20170208163856/http://www.usgbc.org/articles/about-leed> (10 pages).

* cited by examiner

NETWORKED GATE MACHINES GAGING THE CONDITION OF UNMANNED PLATFORMS

RELATED APPLICATIONS

This application claims priority to U.S. Provisional Patent Application No. 62/302,414 filed on Mar. 2, 2016, the entire disclose of which is hereby expressly incorporated by reference.

BACKGROUND

Field of the Disclosure

The present disclosure relates generally to networked gate machines gaging the condition of unmanned platforms, such as drones, unmanned aerial vehicles, etc.

Related Art

Commercial unmanned platforms are growing both in diversity, projected applications, and endurance requirements. One example is physical infrastructure (e.g. power generation and transmission) inspection. As availability needs grow for power, the demand for continuous inspection increases. This, in turn, puts increased reliability demands on unmanned inspection platforms tasked with looking after transmission lines, for example, in hard-to-access spots.

Similar things can be said about other uses of unmanned platforms such as freight transportation and agriculture. As demands for a continuous "belt" of faster freight movement increase, the reliability demands on unmanned freight transportation platform increase at an ever faster pace. In addition, the long-range, beyond-line-of-sight nature of many of these uses necessitates a self-contained means to monitor and safely control platform operation.

Current platform equipment oversight, however, has not progressed and is not projected to catch up sufficiently to these demands. Accordingly, there is a need for an embedded oversight mechanism that looks after the condition of unmanned platform systems and precludes them from ever reaching potential failure. In particular, there is a need for a mechanism that "shadows" system operation. This "shadowing" mechanism must be based on the deepest knowledge of the structure and operation of that system possible. Yet, it should enable rapid reaction to any anomaly detected that can foreshadow potential faults. It should also be capable of operating within a resource constrained computational environment (e.g. microcontrollers). The system of the present disclosure solves these, and other, needs.

SUMMARY

The present disclosure relates to networked gate machines gaging the condition of unmanned platforms. In particular, a system for gaging the condition of unmanned platforms includes a plurality of gate machines each having a processor and a memory. The system further includes a plurality of sensors for receiving operational data for the unmanned platforms and sending the operational data to the plurality of gate machines. The plurality of gate machines can include computer-readable instructions stored thereon which, when executed by the plurality of gate machines, cause the plurality of gate machines to perform various steps. One of the steps can include converting the raw signals from the plurality of sensors to normalized values. Another step can include executing a set of obligations if a gate trigger is valid. Finally, another step can include testing one or more subsequent gates of the plurality of gate machines if the gate closure condition is valid.

A method for gaging the condition of unmanned platforms is also provided. The method can provide a plurality of gate machines each having a processor and a memory. The method can further provide a plurality of sensors for receiving operational data for the unmanned platforms and sending the operational data to the plurality of gate machines. The method can also convert the raw signals from the plurality of sensors to normalized values. The method can additionally execute a set of obligations if a gate trigger is valid. Finally, the method can test one or more subsequent gates of the plurality of gate machines if the gate closure condition is valid.

BRIEF DESCRIPTION OF THE DRAWINGS

The foregoing features of the disclosure will be apparent from the following Detailed Description, taken in connection with the accompanying drawings, in which.

DETAILED DESCRIPTION

Figure 1:
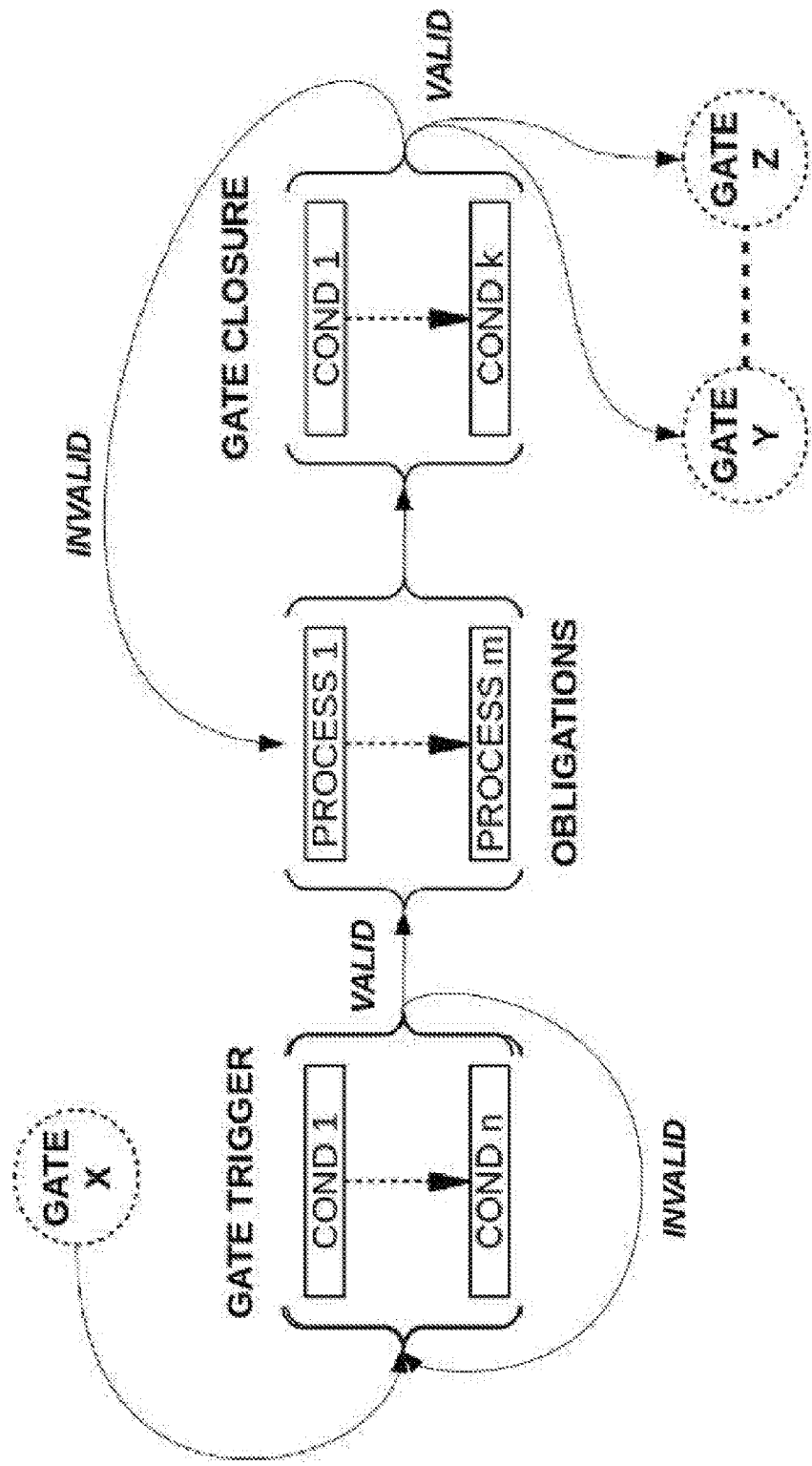
FIG. 1 is a diagram of an individual gate operation.

Disclosed herein are networked gate machines gaging the condition of unmanned platforms, as discussed in detail below in connection with FIGS. 1-5.

The "shadowing" mechanism of the present disclosure is a network of gate machines. Each gate machine resides in an individual hardware configuration (e.g., having a processor and memory) and being attached to the system being "shadowed". Each gate machine has software embedded in these hardware elements and is implemented as a network of linked pairs of conditional expressions, termed gates, coupled with a list of resources, or parameters associated with the operation of the system being "shadowed".

The contents of a resource are values associated with individual operations constituting a single cycle of operation for the system being "shadowed". These values are obtained via physical sensors attached to the "shadowed" system. The sensors can receive operational data for the unmanned platforms and can send the operational data to the gate machine.

More specifically, as used herein, a "resource" is an information structure consisting of the following components:

1. label—an internal identifier of the resource,
2. range—either the maximum and minimum values possible, if a continuous set, or a list of values, if a discrete set,
3. transformation—a formula used to convert the raw signals from a sensor associated with the resource into a normalized value corresponding to range and expressed as a list of operations in a Reverse Polish Notation (RPN) format. See, e.g., en.wikipedia.org/wiki/Reverse_Polish_notation.

Each conditional expression pair in a gate machine consists of a gate trigger conditional expression and a gate closure condition. A gate trigger conditional expression performs continual tests of the contents of one or more resources. The tests can be one of the following:
1. range membership—the contents of a resource are tested for membership in a continuous finite value range or continuous upper-or-lower bounded infinite value range,
2. discrete list membership—the contents of a resource are tested for membership in a discrete list of values.

When the gate trigger conditional expression is validated (e.g. reduces to true), a list of one or more associated processes are enabled, termed obligations. These obligations can be of the following type:
1. get resource—retrieve all the current contents of a resource including the latest reading of its associated sensor device which is translated via the transformation component of the resource,
2. net message—send a message to a resource in another gate machine and retrieve a response,
3. resource comparison—compare the contents of a resource with those of another resource in the same list or a constant value and, if the comparison is invalid (e.g. false), skip the next item in the list of obligations,
4. set resource—add or set a value to the contents of a resource from either the current contents of another resource or a constant value,
5. spectrum—compute a discrete interval spectrum from the contents of a resource.

After the gate trigger is validated, a list of obligations is executed continually. At the end of each obligation list execution cycle, the gate closure conditional expression is tested. If the expression is valid (e.g. reduces to true), the gate machine can proceed to test the gate triggers of one or more subsequent gates in its network. The operation of a gate is summarized in FIG. 1.

Figure 2:
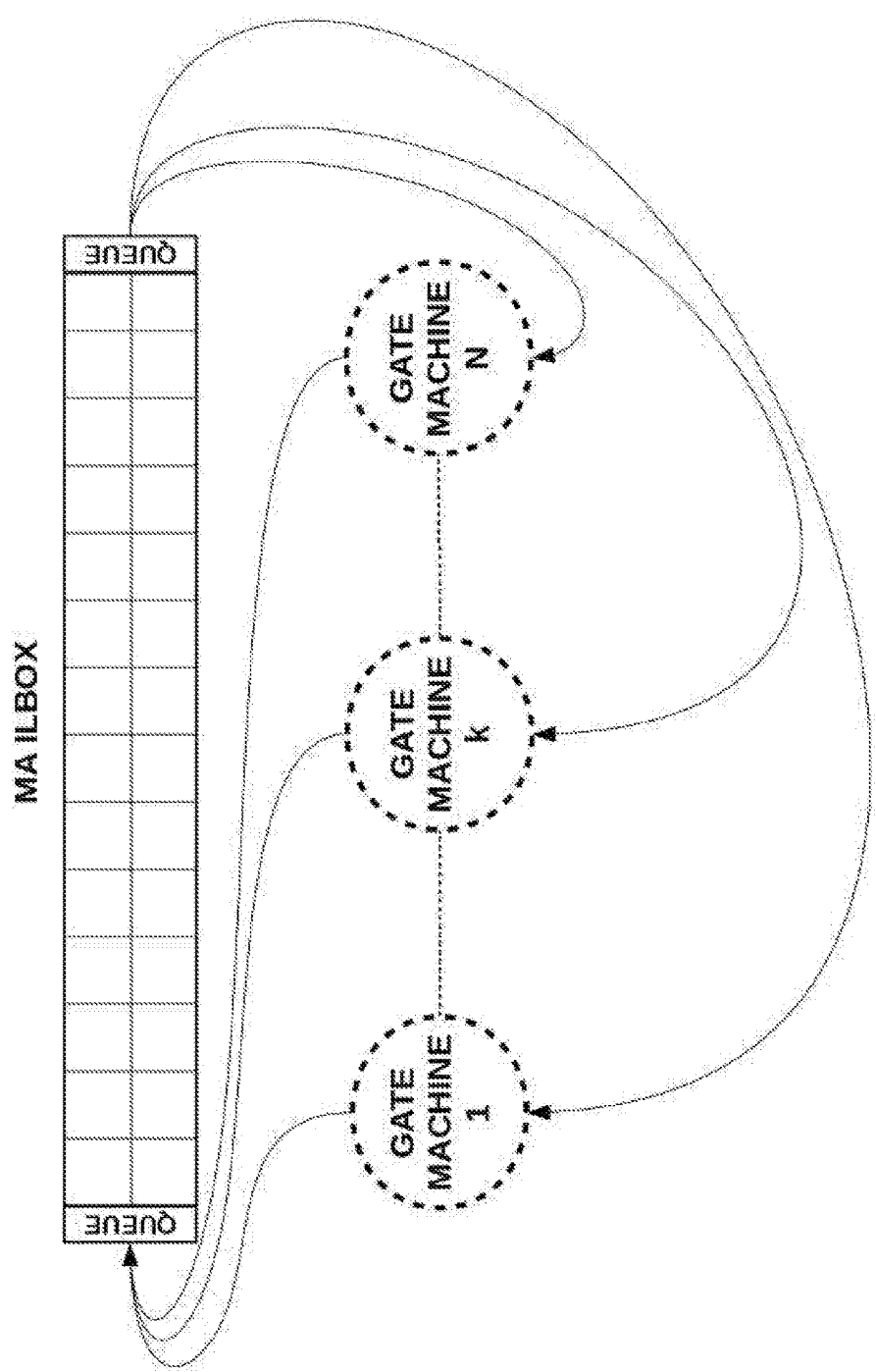
FIG. 2 is a diagram of an inter-gate-machine mailbox server operation.

Whenever the net message obligation process is invoked, it enables a mechanism that synchronizes a gate machine with another. This mechanism is the inter-gate-machine mailbox server. It is a passive server that takes in gate machine messages, processes them based on their type, and returns a corresponding acknowledgement message. This process is performed only when requested, via message, by anyone of the gate machines in the network (hence its passivity), and is illustrated in FIG. 2.

The queues indicated in the mailbox manage message flow to and from the mailbox, with one queue focusing on receiving input messages and another on sending output acknowledgement messages.

Whenever the inter-gate-machine mailbox server is initialized, it retrieves information on identifiers used in addressing the gate machines in the network associated with the specific mailbox. This list of address labels may also include address labels of other mailbox servers. Once initialization is completed, the mailbox server proceeds with its message processing cycle.

The types of messages and processing of such messages is in accordance with the system of the present disclosure as follows:
A. Send the content of a specified mailbox to designated recipient(s)
1. input message: D, the corresponding gate machine address label,
a list of 1 or more designated recipient(s).
2. processing: retrieve the contents of the mailbox associated with the gate machine and send per designated recipient(s) as follows:
SELF—send the contents to the same gate machine that issued the messages,
ALL—send the contents to all gate machines in the network,
List of 1 or more specific gate machine address labels—send the contents to only these gate machines in the network.
3. output message: the contents of the mailbox associated with the gate machine to each designated recipient.
B. Broadcast the contents of a specified mailbox
1. input message: B, the address label of the source gate machine, a list of one or more gate machine address labels,
2. processing: retrieve the contents of the source gate machine's mailbox and send per designated recipient(s) as follows:
ALL—send the contents to all gate machines in the network,
List of specific gate machine address labels (1 or more)—send the contents to only these gate machines in the network,
3. output message: the contents of the mailbox associated with the gate machine to each designated recipient.

In this manner, a gate machine can change the contents of individual resources in another (target) gate machine; thus indirectly altering the behavior of the target gate machine by:
1. altering the results of the obligation processes in one or more gates,
2. preventing the triggering of a gate,
3. preventing the closure of a gate.

The network connecting gate machines to one another and to the mailbox server uses a peer-to-peer (e.g. Controller Area Network ("CAN")) protocol. See, e.g., www.can-wiki.info. Gate machines and gate machine networks can be applied directly to remedial control for unmanned platforms.

Remedial control is the application of changes to a pre-defined plan as a result of degradation in the behavior of internal components of the platform (e.g., payload, propulsion, communication). These changes are initiated by messages sent to the unmanned platform controller by gate machines "shadowing" internal components describing the behavior degradation. The controller then scans, interprets, and acts on these messages through it's own embedded gate machine that clears execution of mission tasks per the pre-defined mission plan.

The pre-defined mission plan is defined as a task list (see below). The assumptions in the task list conducts their tests by linking to specific, shared resources handle by one or more gate machines.

Figure 3:
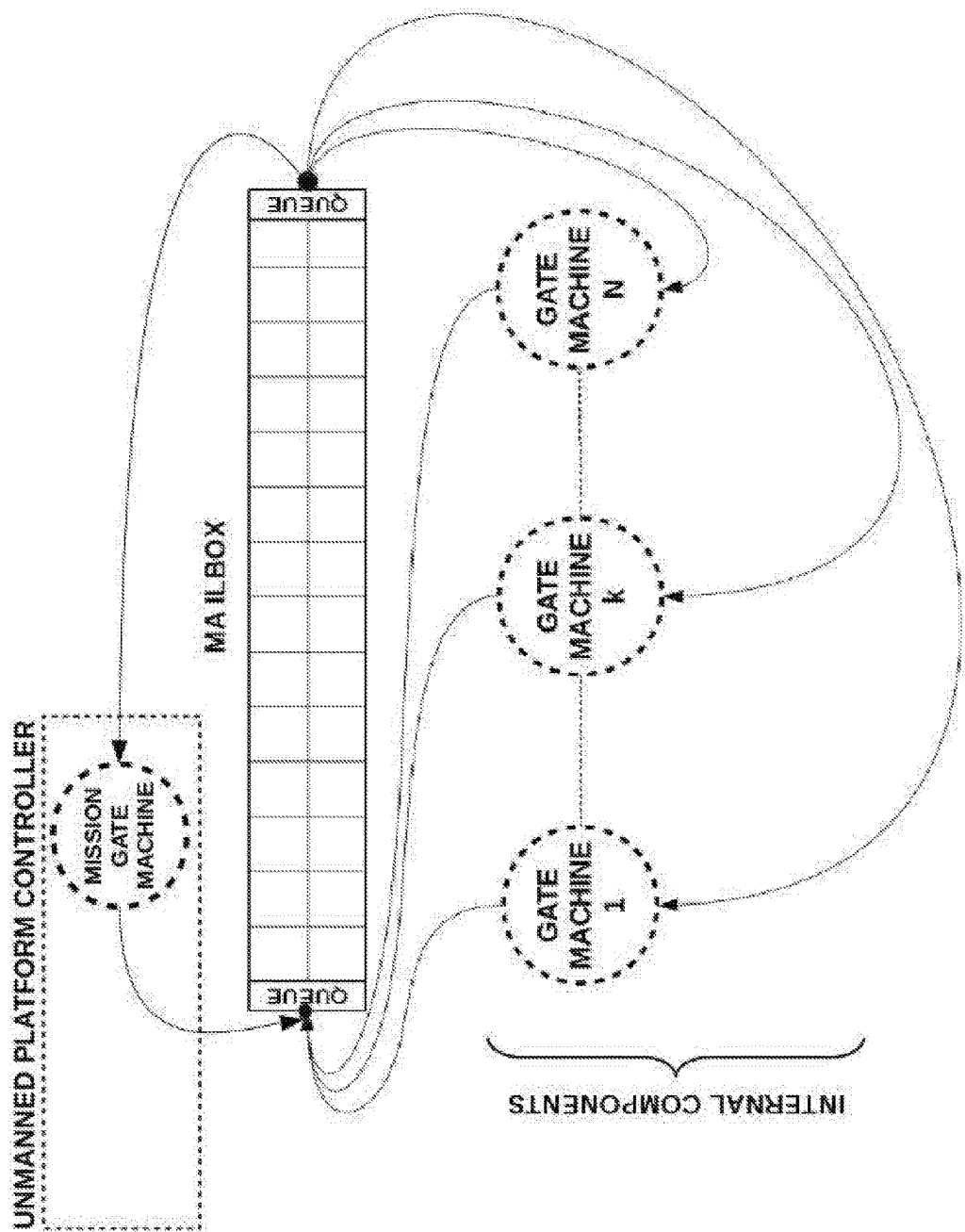
FIG. 3 is a diagram of a mission gate machine interaction with the mailbox server.
Figure 4:
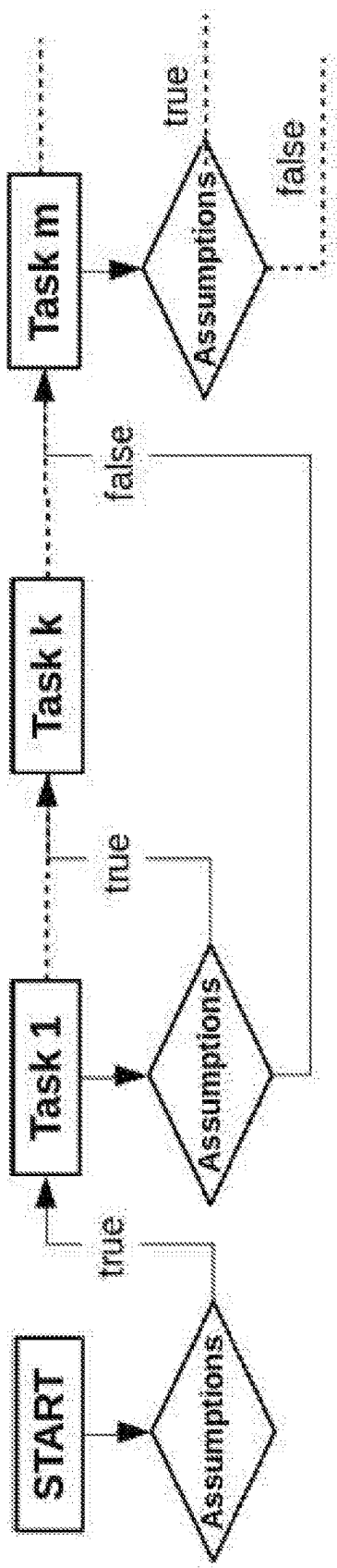
FIG. 4 is a diagram of a task list operation.

Inside the platform (e.g., flight) controller, a mission gate machine operates in conjunction with the gate machine network "shadowing" the internal components of the platform as described in FIG. 3. As outlined in FIG. 3, the mission gate machine interacts with the mailbox server just like the other gate machines "shadowing" the internal components of the platform. The mission gate machine has a unique operation in that:
1. its gate trigger verifies a particular status of one or more internal components,
2. its obligations modify, if necessary, and enable execution of a mission task per the status
3. its gate closure verifies task completion or changes in the status of the internal components Changes in the status in the internal components can lead to transition into another gate dealing with that change. Task completion, on the other hand, sets the corresponding assumption in the mission task list as valid (true) or invalid (false). This is done through resources in the mission gate machine shared with the task list.

As an example, take the following unmanned platform configuration and situation. A vertical take-off-and-landing (VTOL) unmanned platform consists of a:

- a flight controller managing a mission and embedded in the platform body
- a gyro stabilizer assembly attached to the platform body
- a camera attached to the gyro stabilizer assembly
- an electric motor propulsion system
- a battery power supply embedded in and supplying the platform The mission of the platform is to provide continuous construction site survey over a 12 hour period. The gyro stabilizer assembly, propulsion system, and power supply have attached to each a gate machine "shadowing" their operation.

After being subject to multiple 12-hour operational cycles over a long time period, this configuration is subjected to 2 behavior degradation scenarios requiring remedial control:

Scenario #1—gyro stabilizer degradation: The gate "shadowing" servo response in the gyro stabilizer gate machine passes a resource comparison against the orientation change resource in its obligation list. This comparison senses an overshoot condition. So, the next item in the list is a net message that posts a gyro anomaly to the mission gate machine in the flight controller. As a result, the mission gate machine sets a gyro status resource to a restricted state. This resource is also part of an assumption test in the task list which, having failed, gives control to a task whereby the propulsion system manipulates the platform to compensate for the gyro stabilizer restriction in order to complete a stage of the current construction site survey. Following completion of that stage, the task places a gyro stabilizer replacement message in the log and returns the platform to base.

Scenario #2—unusual battery drainage rate: A gate trigger in the gate "shadowing" battery drainage in the power supply gate machine tests the drainage rate resource for being outside of an acceptable drainage rate. In this case, the trigger enables an obligation list that enables a net message posting a battery drainage anomaly to the mission gate machine. In a manner similar to the prior scenario, the assumption tests in the task list for the flight controller enable a task that slows the speed in order to reduce power use. Once that is completed, a resource is set with the current power level. This triggers an assumption test which enables a reduced-power task. This task calculates available power and determines flight time left at current power level. The flight time available is posted as a resource which triggers an assumption test for a limited survey task. This task, in turn, completes the next stage of the survey, places a battery replacement message in the maintenance log and returns the platform to base.

Extensions: The same network gate machine structure can be used to also operate the system itself. Thus, monitoring and control can be performed through a distributed hybrid (control+monitoring) system that exchanges, through a peer-to-peer protocol, commands that induce state changes. These changes, when carried out in a sequence of one-to-many cascade of commands, can also provide a modular approach to enable platform control mechanism by adding control functionality by simply attaching the associated system to the platform.

Another option is to integrate directly a task list (see below) to carry out mission tasks coupled with a gate machine network. In this configuration, assumptions in the task list are performed on resources shared directly with the gate machines, and not through a mission gate machine. Other applications areas for network gate machines are:

Robotics—integrate and coordinate the operation of a robot performing multiple operations and/or requiring the integration of multiple end effectors.

Security—provide an intelligent mechanism that can provide autonomous security in a building, warehouse, shop, or home requiring the integration and coordination of several devices needed to perform surveillance and notification actions.

Home Automation—integrate, coordinate, and monitor the operation of household appliances and devices, autonomously under minimal human supervision, to significantly streamline the day-to-day activities of home dwellers; in effect act as a robotic majordomo.

Building Facilities Management—integrate, coordinate, and monitor the operation of building infrastructure (e.g., HVAC, power distribution, plumbing), autonomously under minimal human supervision, in order to provide best possible comfort to residents and/or office workers following LEED guidelines. See, e.g., www.usgbc.org/articles/about-leed.

Traffic Management—coordinate, monitor, and integrate autonomously the operation of devices embedded in a roadway in order to enable self-driven vehicles and streamline traffic flow.

Assumption-Driven Task Interpreter: The Assumption Driven Task Interpreter verifies the condition of platform internals before executing a subset of platform controller commands. This verification provides the ability to skip one or more subsets of commands in case of degraded platform operation to a subsequent command subset that the platform is able to accomplish even under the detected degradation of the platform internals.

To begin with, a set commands can be partitioned into subsets of commands closely related to each other. These subsets are known as tasks. More specifically, a task can be viewed as an information structure consisting of the following components:

1. TaskID—a label (pointer) identifying this task.
2. TaskBody—the list of commands within a subset encapsulated in this task.
3. Assumptions—a list of tests against the current settings of a set of parameters gaging the condition of platform internals (settings are supplied through a NGM network. It is implemented as conjunction of condition test that either result in a value of true or false.
4. NextTask—TaskID for the next task to follow if the tests in Assumptions show no degradation (or fault) in platform internals.
5. SkipToTask—TaskID for the next task to follow if the tests in Assumptions show degraded (or faulty) behavior in platform internals.

Thus, the original set of commands is transformed into a list of tasks. The operation of this task list is summarized in FIG. 4.

In effect, operation of the list is a traversal through a dynamic network. The traversal is driven by the results of the Assumptions tests whose results can vary over time depending on the settings of the platform internals gaging parameters.

START is a special task simply used to commence the network traversal. Its components are as follows:
1. TaskID—START
2. TaskBody—NONE
3. Assumptions—NONE
4. NextTask—Task 1

5. SkipToTask—NONE

In effect, START just enables passage to Task 1. Any task ending the list will have NextTask pointing to START to restart the network traversal.

Figure 5:
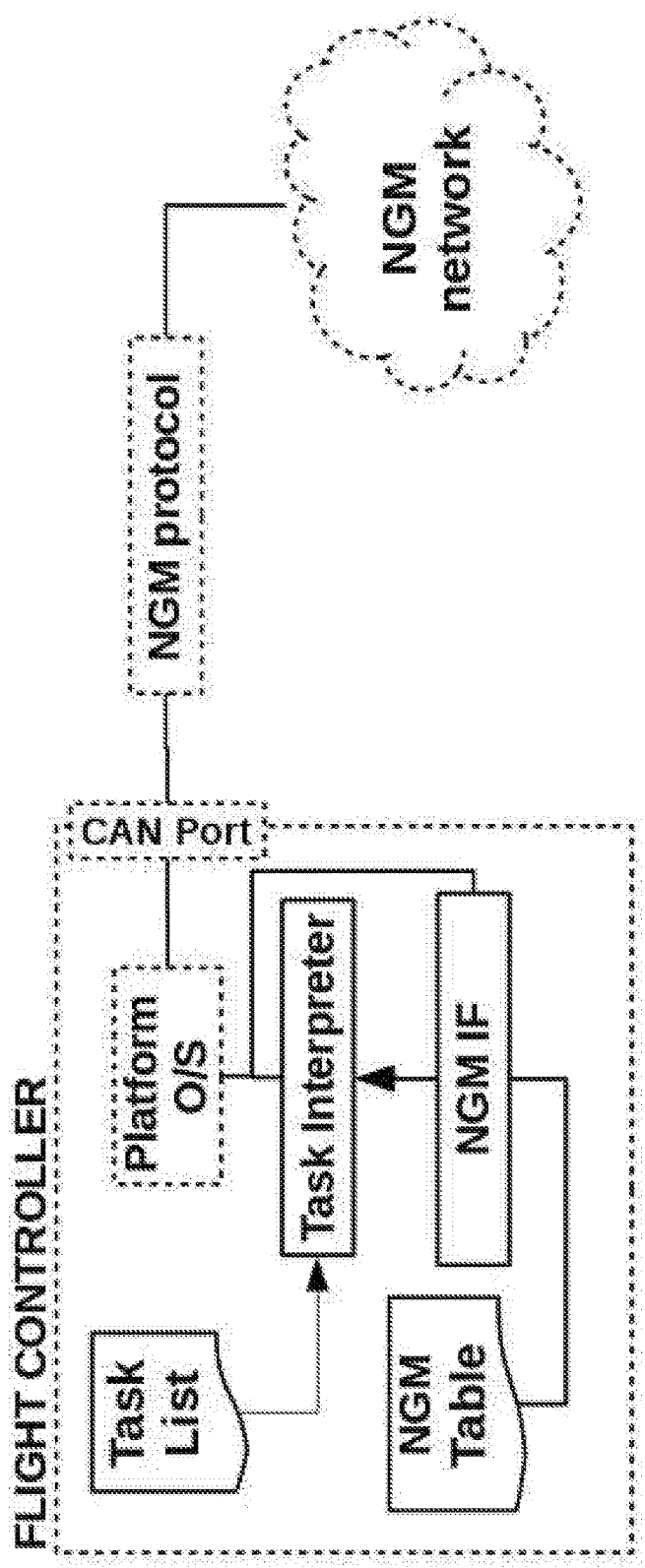
FIG. 5 is a diagram of a task interpreter configuration.

This structure is followed because of the algorithm involved in network traversal which is implemented through the configuration outlined in FIG. 5. The components in FIG. 5 are as follows:

A. Next Generation Mobile ("NGM") network—(see above)

B. NGM protocol—(see above)

C. CAN Port—hardware attachment point to the NGM network supporting the CAN (Controller Area Network) protocol.

D. Platform O/S—operating system managing hardware resources and software operation in the flight controller (e.g. ROS, Linux)

E. Task List—an internal representation of the task list described above

F. NGM Table—an internal list of the latest settings for the platform internals gaging parameters.

G. NGM IF—an internal process retrieving settings for the platform internals gaging parameters and also supplying them to the Task Interpreter.

H. Task Interpreter—an internal process enabling network traversal of the Task List.

The key elements in this configuration are the last 2. First, NGM IF consists of 2 components. The first one, NGM Store, is an interrupt handler under the Platform O/S associated with CAN Port events and operates as follows:

1. Retrieve any NGM protocol messages received through the CAN Port.
2. Extract platform internals gaging parameters from the messages.
3. Store extracted setting in the appropriate slots of the NGM Table.

The second component, NGM Get, is a function used by the Task Interpreter that, given a platform internals gaging parameter label (pointer), retrieves the latest stored setting associated with that parameter.

The Task Interpreter is basically a daemon (process that is always enabled and runs in a priority just below the Platform O/S) and operates as follows:

A. Loop Always
1. Set ThisTask to START.
2. Set ThisAssumption to true.
3. For ThisTask in Task List,
   1. Retrieve the components of ThisTask (TaskBody, Assumptions, NextTask, SkipToTask).
   2. Perform the command list in TaskBody for ThisTask.
   3. Retrieve the current setting for the gaging parameters used in Assumptions for ThisTask.
   4. Perform the tests and their conjunction in Assumptions for ThisTask
      If the results in (4) above yield true (i.e., no degradations detected) then set ThisTask to NextTask; else set ThisTask to SkipToTask.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention.

What is claimed is:

1. A system for gaging the condition of unmanned platforms
   comprising:
   a plurality of gate machines each having a processor and a memory; and
   a plurality of sensors for receiving operational data for the unmanned platforms and sending the operational data to the plurality of gate machines as raw signals,
   wherein the plurality of gate machines:
      convert the raw signals from the plurality of sensors to normalized values;
      execute a set of obligations if a gate trigger is valid; and
      test one or more subsequent gates of the plurality of gate machines if a gate closure condition is valid.

2. The system of claim 1, wherein the set of obligations comprise sending a message to another gate machine and retrieving a response.

3. The system of claim 2, further comprising an inter-gate machine mailbox for receiving a plurality of messages from the plurality of gate machines and processing the messages based on their type.

4. The system of claim 3, wherein at least one of the plurality of gate machines alters the contents of a target gate machine through the use of the inter-gate mailbox.

5. The system of claim 4, wherein the at least one of the plurality of gate machines alters the target gate machine by altering the set of obligations of the target gate machine, preventing the triggering of the target gate machine, or preventing the closure of the target gate machine.

6. The system of claim 5 further comprising a mission gate machine linked to the inter-gate mailbox.

7. The system of claim 6, wherein the mission gate machine includes a gate trigger to verify a particular status of one or more internal components of the unmanned platforms through the plurality of gate machines.

8. The system of claim 7, wherein the mission gate machine includes a plurality of obligations for modifying and enabling a mission task.

9. The system of claim 8, wherein the mission gate machine includes a gate closure for verifying task completion or changes in the status of the one or more internal components.

10. The system of claim 9, wherein the mission gate machine includes a plurality of mission tasks coupled to the plurality of gate machines.

11. A method for gaging the condition of unmanned platforms comprising:
    providing a plurality of gate machines each having a processor and a memory;
    providing a plurality of sensors for receiving operational data for the unmanned platforms and sending the operational data to the plurality of gate machines as raw signals,
    converting the raw signals from the plurality of sensors to normalized values;
    executing a set of obligations if a gate trigger is valid; and
    testing one or more subsequent gates of the plurality of gate machines if a gate closure condition is valid.

12. The method of claim 11, further comprising the step of sending a message to another gate machine and retrieving a response.

13. The method of claim 12, further comprising the step of providing an inter-gate machine mailbox for receiving a plurality of messages from the plurality of gate machines and processing the messages based on their type.

14. The method of claim 13, further comprising the step of altering the contents of a target gate machine through the use of the inter-gate mailbox.

15. The method of claim 14, further comprising the step of altering the set of obligations of the target gate machine, preventing the triggering of the target gate machine or preventing the closure of the target gate machine.

16. The method of claim 15, further comprising the step of providing a mission gate machine linked to the inter-gate mailbox.

17. The method of claim 16, further comprising the step of including in the mission gate machine a gate trigger to verify a particular status of one or more internal components of the unmanned platforms through the plurality of gate machines.

18. The method of claim 17, further comprising the step of including in the mission gate machine a plurality of obligations for modifying and enabling a mission task.

19. The method of claim 18, further comprising the step of including in the mission gate machine a gate closure for verifying task completion or changes in the status of the one or more internal components.

20. The method of claim 19, further comprising the step of including in the mission gate machine a plurality of mission tasks coupled to the plurality of gate machines.

* * * * *